United States Patent [19]

Goserud

[11] Patent Number: 4,606,110

[45] Date of Patent: Aug. 19, 1986

[54] TOOL AND METHOD FOR POSITIONING CEILING RUNNERS

[75] Inventor: J. Thomas Goserud, Midlothian, Va.

[73] Assignee: Armstrong World Industries, Inc., Lancaster, Pa.

[21] Appl. No.: 753,980

[22] Filed: Jul. 11, 1985

[51] Int. Cl.[4] .......... B23P 11/00

[52] U.S. Cl. .......... 29/432; 33/180 R; 52/747; 269/37; 29/559

[58] Field of Search .......... 269/40, 43, 904, 910, 269/37; 33/180, 168 R, 562; 52/484, 485, 486, 749, 747; 29/559, 432

[56] References Cited

U.S. PATENT DOCUMENTS

| | | | |
|---|---|---|---|
| 1,850,735 | 3/1932 | Venzie | 52/485 |
| 3,583,694 | 6/1971 | Davies | 269/43 |
| 4,304,078 | 12/1981 | Meriwether, Jr. | 52/749 |
| 4,322,064 | 3/1982 | Jarvis | 269/43 |

*Primary Examiner*—Frederick R. Schmidt
*Assistant Examiner*—Judy J. Hartman

[57] ABSTRACT

A spacer bar is used to place ceiling runners at a predetermined distance apart. At either end of the bar is pivotally mounted a holder and this allows the bar connecting together the two holders to be freely movable relative to the holders. A holder is placed on one runner in position and the second holder holds a new runner to be placed in position. The new runner may be swung in position and spaced from the first runner due to the means connecting the two runners together.

1 Claim, 2 Drawing Figures

TOOL AND METHOD FOR POSITIONING CEILING RUNNERS

BACKGROUND OF THE INVENTION

1. Field of the Invention

The invention is directed to a tool for mounting ceiling runners in position and, more particularly, is directed to a jig which fastens to one end of a runner already fastened in position and contains a new runner at the opposite end of the jig and holds the new runner in an exact spacing from the first runner which permits mounting of the second runner in its proper position.

2. Description of the Prior Art

U.S. Pat. No. 4,432,182 discloses a runner 2 which is meant to be mounted in position on the underneath of floor joists and the runner must be nailed to a plurality of floor joists.

U.S. Pat. No. 4,322,064 is directed to a spacing tool to hold ceiling rafters in position, and U.S. Pat. No. 2,567,586 is directed to a template for setting timbers in position for uniform nailing.

SUMMARY OF THE INVENTION

The invention is directed to a layout jig for positioning ceiling runners in position on the underside of floor joists. The jig consists of a first holder of generally I shape which can be positioned on a first runner. A second holder, also of generally I shape, is placed on a second runner which is to be positioned relative to the first runner. A connecting means holds the two holders a fixed distance apart and is attached to both holders so that the structure may be utilized in the below described manner.

A method for positioning and holding ceiling runners in position is provided whereby a first runner is fastened to its proper position on the underside of a number of floor joists. The first holder of the jig is fastened to the horizontal flange of said first runner. A second runner is positioned in the second holder while the jig hangs from the first runner. The jig is then swung into a horizontal position so that the second runner is placed up against the underneath of a plurality of floor joists a fixed distance from the first runner. The second runner is fixed in position and the holder is removed from the first runner and permitted to hang down below the second runner now fixed in position. A third runner is now positioned in the holder which previously engaged the first runner and the sequence of mounting runners in position is repeated.

DESCRIPTION OF THE PREFERRED EMBODIMENT

Figure 2:
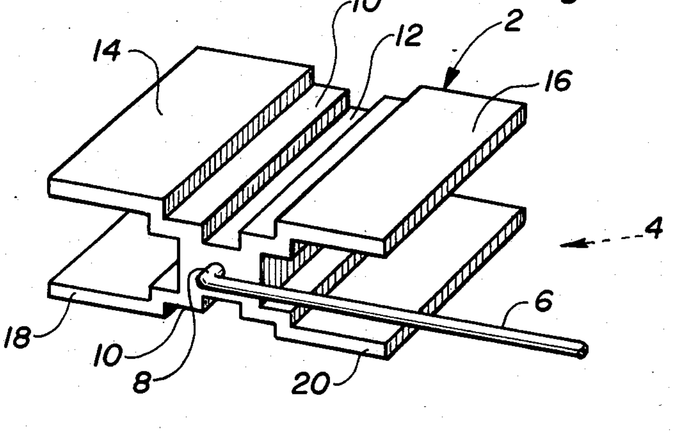

The jig or tool of the invention herein is shown in FIG. 2 wherein there is a first holder 2 and a second holder 4 connected together by a rod 6 which functions as the means for holding together at a fixed spacing apart the holders 2 and 4. The rod 6 is pivotally mounted at 8 to each holder so that the holders are freely rotatable around the end of the rod which is bent at a right angle to slide into a hole in the center of each holder.

Each holder is of generally I shape with a recess 10 in the center of both the top and bottom of the I shape. The center of the I is formed by element 12 and the top of the I is basically formed by the flanges 14 and 16 while the base of the I is formed by the flanges 18 and 20. Naturally, the recess area in either side of the flanges 14, 16, 18, and 20 prevent the top and bottom of the I from being straight parallel surface.

Figure 1:
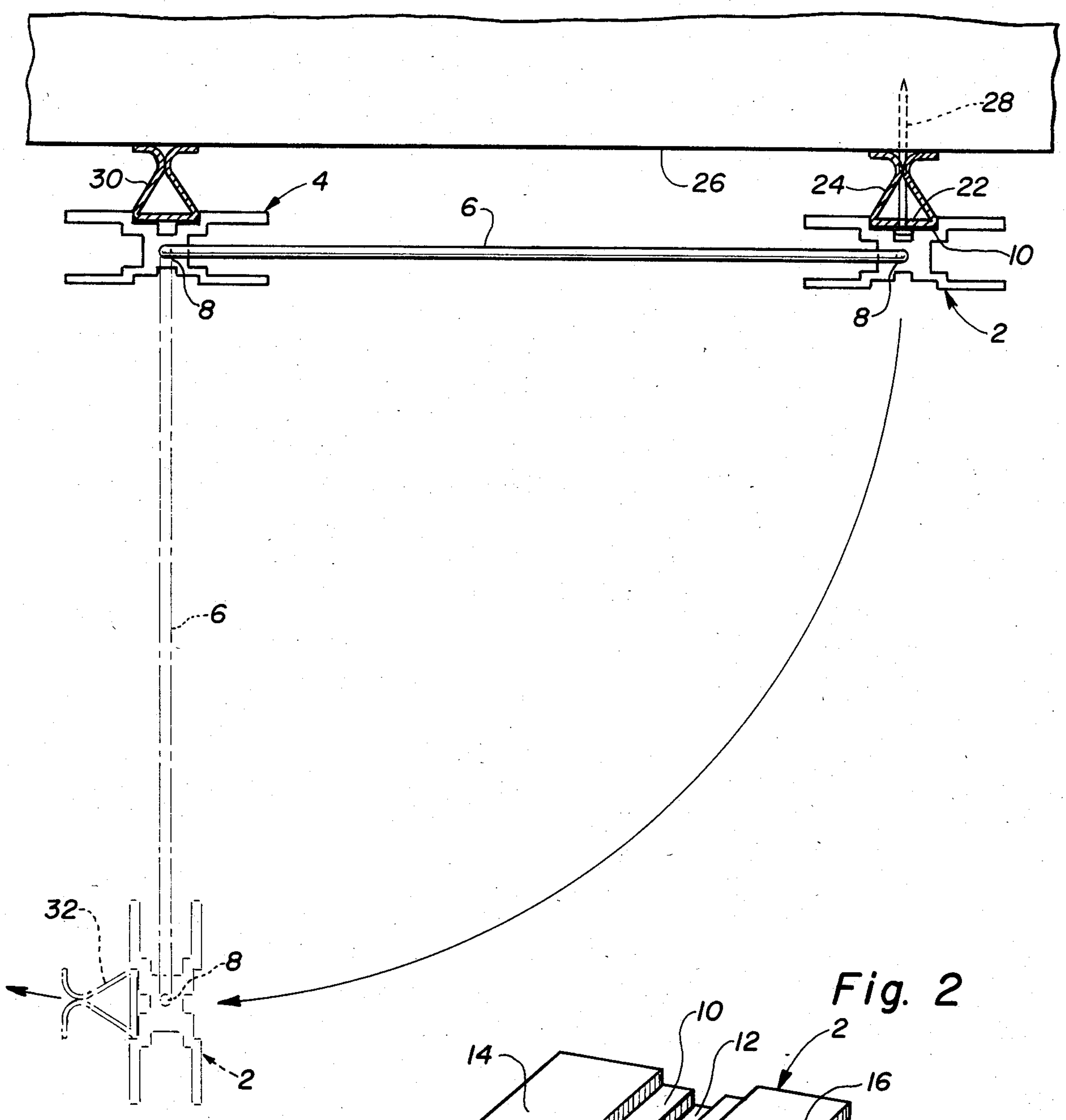
FIG. 1 of the drawing is an end view of the runner structure being used to position runners on the underside of ceiling joists, and FIG. 2 of the drawing is a prospective view of the jig utilized in the structure of FIG. 1.

In operation as shown in FIG. 1, the horizontal flange 22 of the ceiling runner 24 disclosed in U.S. Pat. No. 4,432,182 is positioned in the recess 10. The size of the recess is such that the horizontal flange of the runner 22 will frictionally fit into the sides of the recess and the runner and holder will be held together by friction. A first runner 24 is placed on the underside of a plurality of floor joists, one of which is shown as element 26 and a nail 28 is used to fasten the ceiling runner 24 to the rafter 26. The ceiling runner would be nailed in a number of places to a number of separate floor joists. Once the first runner is in position on the underside of a number of floor joists in its proper location, the first holder 2 would be fastened to the horizontal flange 22 of the first runner by having the horizontal flange 22 positioned in the recessed area 10. Normally, the runners are four to eight feet long and at least two jigs would be utilized, one at each end of the runner. The jig would normally be permitted to hang from the first runner so that the first holder 2 would be positioned on the first runner and the second holder 4 would hang directly below the first holder and the two holders would be held together by the connecting means 4. A second runner 30 would be placed in the recessed area of the second holder and the second holder would then be swung upward until the second runner 30 engaged the underside of the floor joist 26 at a fixed distance along the floor joist from the position of the first runner 24. Nails would then be utilized to fasten the second runner 30 in position to a plurality of floor joists.

As was indicated previously, the connecting means 4 is pivotally fastened to the two holders. As now shown in FIG. 1, with both runners 24 and 30 nailed in position, the holder 2 is removed from the horizontal flange of runner 24 and the jig is permitted to move to the position shown on the left side of FIG. 1 wherein holder 2 now hangs below holder 4 connected together by the connecting means 6. Due to the pivotal relationship between the connecting means 6 and the holders, the parts are able to move freely relative to each other. As shown in FIG. 1, a third ceiling runner 32 is placed in the recess of holder 2. It should be noted that holder 2 was removed from runner 24 wherein runner 24 was positioned in the recess on the right side of the holder and new runner 32 is being positioned on the recess on the left side of the holder. Due to the recesses on both sides of the holder 2, the preferred use of the tool is to leave the holder in position on the runner fastened to the floor joists and place the new runner to be mounted in the other recess of the holder before the holder is released from its prior positioned runner. It is noted that the invention is disclosed with a recess on both sides of the holder. But the invention is equally operable by having a recess on only one side of the holder and simply positioning the holder with regard to the connecting bar 6 depending on where the next runner will be positioned.

With the holder 2 now hanging down from holder 4, it is now possible to place the third runner in the recess of holder 2. Holder 2 will now be swung up into position so that runner 32 can be placed against a floor joist a fixed distance from runner 30 due to the means 6 which is connecting the two holders together a fixed distance. After the next runner is fastened in position to the underside of the floor joists, holder 4 would be disconnected from runner 30 and would be permitted to hang down in the manner shown generally in the drawing so that a fourth runner may be mounted in position this time in holder 4. Such an operation is repeated until all the desired runners are in position on the floor joists.

Consequently, it can be seen that it is now possible to use the tool or jig of the invention herein to position a number of ceiling runners in position in a parallel relationship spaced a fixed distance one to the other. Such a tool is much more preferable to use than a measuring tape which would require one to measure the spacing between runners as each runner is placed in position. The shape of the holder disclosed is shown as the preferred embodiment. Basically all that is required of the holder is that it be generally pivoted to a rod and contain a recess for receiving the horizontal flange of a runner to frictionally hold the runner in the holder until such time as the runner is placed in position against the underneath of a floor joist so that the runner may be nailed in position.

What is claimed is:

1. A method for positioning and holding ceiling runners in position on the underside of floor joists, said method using a layout jig having a first holder with a recess to receive and hold on horizontal flange of a ceiling runner, a second holder of the same construction, and a means pivotally connected to both first and second holders to hold said first and second holders a fixed distance apart, the steps comprising:

(a) fastening a first runner in position on a underside of a number of floor joists in its proper location, (b) attaching the first holder to the horizontal flange of said first runner by inserting said flange in the recess of the holder and frictionally holding the flange in said recess, (c) permitting said second holder to hang down from the runner to which the first holder is fastened due to the pivotally connected means holding the first and second holders together a fixed distance apart, (d) placing and holding a second runner in the recess of the second holder, (e) swinging the second holder with its runner up against the floor joists to position said second runner a fixed distance from said first runner due to the means connecting the both holders together a fixed distance apart, (f) fastening said second runner in position on an underside of a number of floor joists and then disconnecting said first holder from said first runner, and (g) repeating steps (d), (e), and (f) using said first holder to receive a third runner.

* * * * *